United States Patent [19]
Oldani et al.

[11] Patent Number: 5,094,732
[45] Date of Patent: Mar. 10, 1992

[54] PROCESS AND APPARATUS FOR REMOVING NITRATES FROM A WATER STREAM DURING THE TREATMENT OF PROCESS WATER

[75] Inventors: Markus Oldani, Wettingen; Alex Miquel, Zurich; Gunter Schock, Birmenstorf, all of Switzerland

[73] Assignee: Asea Brown Boveri Ltd., Baden, Switzerland

[21] Appl. No.: 514,512

[22] Filed: Apr. 25, 1990

[30] Foreign Application Priority Data

Apr. 28, 1989 [CH] Switzerland .................. 1635/89

[51] Int. Cl.$^5$ .................. B01D 13/02; C25B 7/00
[52] U.S. Cl. .................. 204/182.4; 204/151; 204/301
[58] Field of Search .................. 204/301, 182.4, 151, 204/91

[56] References Cited

U.S. PATENT DOCUMENTS

| | | | |
|---|---|---|---|
| 3,510,417 | 5/1970 | Mizutani et al. | 204/301 |
| 3,510,418 | 5/1970 | Mizutani et al. | 204/301 |
| 4,246,092 | 1/1981 | Perry et al. | 204/301 |
| 4,253,929 | 3/1981 | Keritsis | 204/301 |
| 4,715,939 | 12/1987 | Ball et al. | 204/182.4 |
| 4,717,450 | 1/1988 | Shaw et al. | 204/182.4 |
| 4,802,966 | 2/1989 | Aoki et al. | 204/182.4 |

FOREIGN PATENT DOCUMENTS 0315510 5/1989 European Pat. Off.

OTHER PUBLICATIONS

"Optimization of Flow Design in Forced Flow Electrochemical Systems, with Special Application to Electrodialysis", A. Sonin et al., *Ind. Eng. Chem.*, Process Des. Develop., vol. 13, No. 3, 1974.

"Separation of Nitrate from Well Water by Membrane Processes (Reverse Osmosis) Electrodialysis Reversal", R. Rautenbach, et al., AQUA No. 5, 1986, pp. 279-282.

"Nitrate-Selective Anion-Exchange Membranes", A. Eyal, et al., Journal of Membrane Science, 38 (1988), pp. 101-111.

"Effect of Turbulence on Limiting Current in Electrodialysis Cells", D. Cowan et al., Industrial and Engineering Chemistry, vol. 51, No. 12, Dec. 1959.

Primary Examiner—John Niebling
Assistant Examiner—Arun S. Phasge
Attorney, Agent, or Firm—Burns, Doane, Swecker & Mathis

[57] ABSTRACT

Process and apparatus for removing nitrates during the treatment of process water, based on an electrodialysis process where, through the use of suitable membranes (3, 4), a preferential migration of nitrate ions $NO_3^-$, and thus selective removal of toxic nitrates, is achieved. Anion exchange membrane (3) having a selectivity for chloride transport over sulfate transport of >1. Cation exchange membrane (4) having a selectivity for $Na^+$ transport over $Ca^{2+}$ transport of >1. The membranes (3, 4) are plastic membranes having a surface treatment.

11 Claims, 2 Drawing Sheets

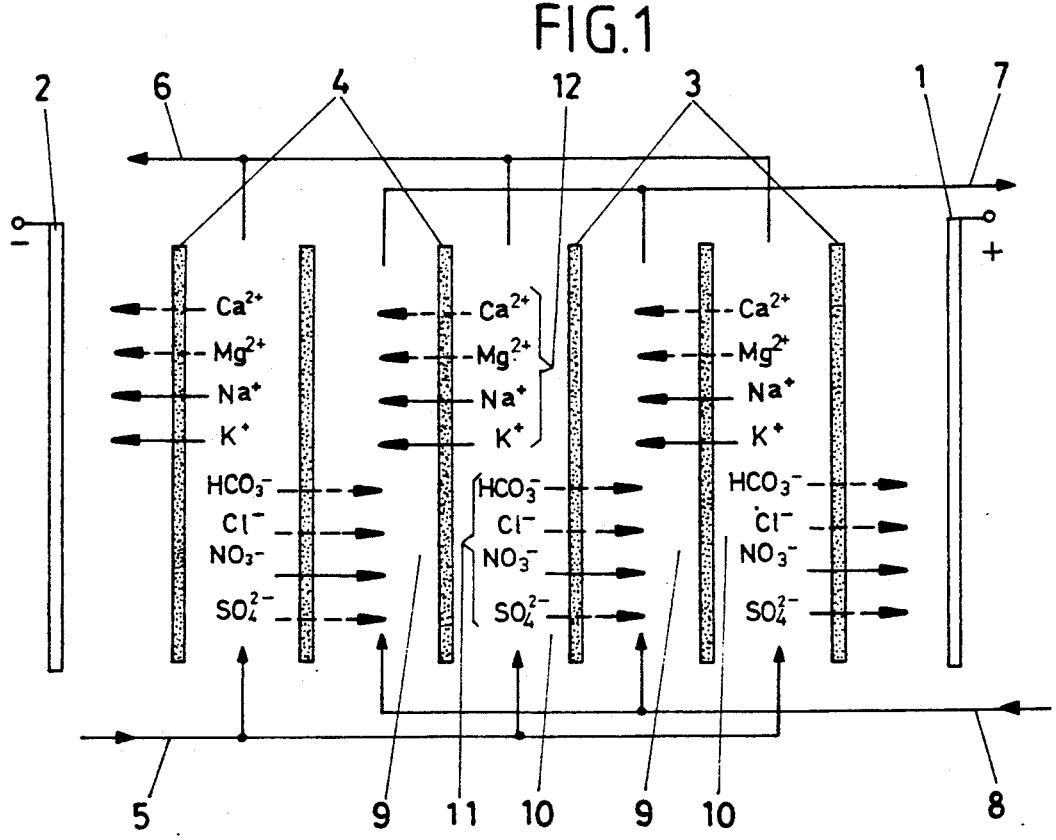
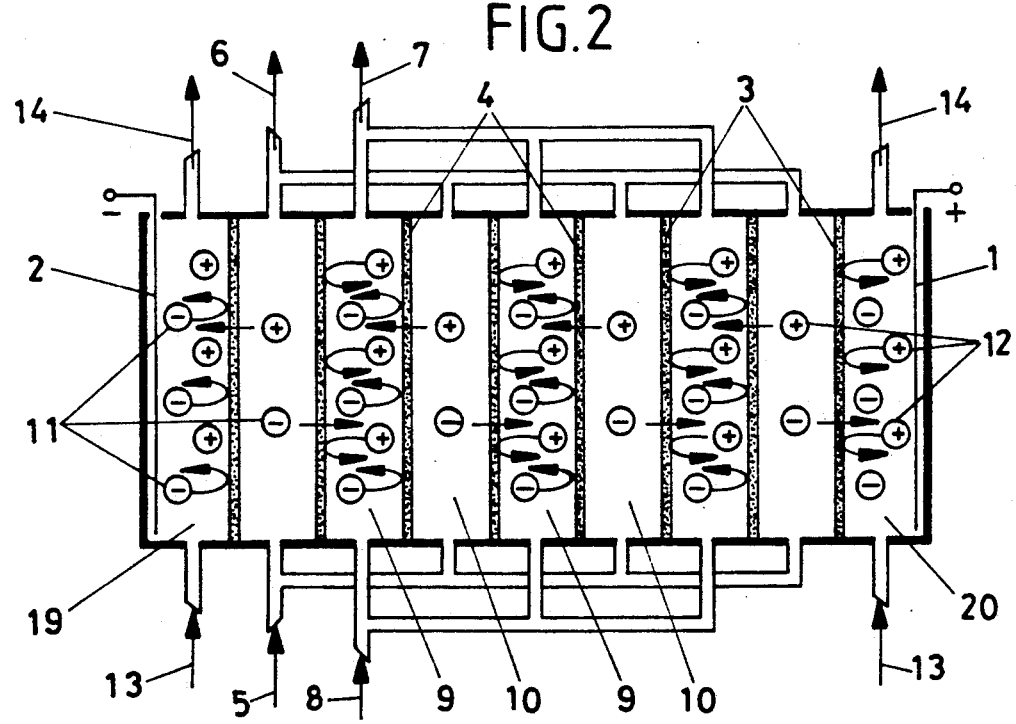

PROCESS AND APPARATUS FOR REMOVING NITRATES FROM A WATER STREAM DURING THE TREATMENT OF PROCESS WATER

BACKGROUND OF THE INVENTION

1. Field of the Invention

The invention pertains to a process and an apparatus for removing nitrates from a water stream as per the preamble to patent claims 1 and 6.

2. Discussion of Background

In the preamble, the invention relates to the prior art as known from the German Journal Chemie Ingenieur Technik 58 (1986) No. 12, pp. 938-945. In this, advantages and disadvantages of reverse osmosis and electrodialysis are compared. In electrodialysis, several non-selective anion exchange membranes and non-selective cation exchange membranes are arranged in series (module arrangement) between an anode made from platinum-plated steel and a cathode made from V2A steel. It is thereby theoretically possible to remove nitrate/chloride selectively, but for many cases such removal is inadequate in practice, since sulfate ions remain substantially in the diluate. In industry, the plant is operated at about 80% of the limiting current density, which is apparent from a sharp decrease in the pH. Any deposits on the membranes can be counteracted by periodically reversing the poles about every 4 hours and simultaneously switching the diluate and retentate chambers.

It was not stated that membranes having a selectivity for nitrate over sulfate are particularly suitable and that the selectivity increases with decreasing current density.

In the treatment of process water for the supply of drinking water, the level of toxic salts must be reduced to the extent that the residual level does not exceed the maximum values required by the authorities. Recently, the increasing nitrate content of the water (groundwater, spring water, river water etc.) to be used for providing process water and drinking water has caused difficulties.

The invention relates to the further development and improvement of the electrodialysis process for removing toxic salts in water, with the removal of nitrates at the highest possible water yield having priority.

In the more narrow sense, the invention relates to a process and an apparatus for removing nitrates from a water stream during the treatment of process water, based on an electrodialysis process which produces, on the one hand, a concentrate which has high concentrations of nitrate ions and is branched off from the water stream, and, on the other hand, leaves a diluate which contains low levels of nitrate ions and is to be used as process water.

The importance of reducing the nitrate content of ground water and drinking water is constantly increasing as a result of health and environmental legislation. Currently, the following processes are indicated in this respect for water treatment:
  biological processes,
  ion-exchanger processes, and
  membrane processes.

The membrane processes can be sub-divided into:
  reverse osmosis and
  electrodialysis.

Of these known processes for reducing the nitrate content, none has clearly dominating advantages. They all leave something to be desired in a technical and economic respect. Biological and ion-exchanger processes and reverse osmosis require the addition of chemicals, which is inconvenient, environmentally damaging and expensive. In addition, the biological process is very maintenance-intensive and requires considerable monitoring. In other processes, the nitrate removal is not specific enough.

Processes and apparatuses for carrying out electrodialysis, including removal of nitrates from solutions, are known. Furthermore, the treatment of nitrate-containing water by means of reverse osmosis and electrodialysis is known. The method of electrodialysis of aqueous solutions using selective membranes, the ions of relatively low charge being preferentially transported, is likewise known. Nevertheless, details on the membranes used, the current density, etc., are often lacking.

Certain homogeneous, thin, asymmetric or combination membranes have the property that either blocking by insoluble salts on the non-coated side in the concentrate chamber very easily occurs, and cannot be eliminated even by reversing the poles, or that the electrical resistance is too high in the case of homogeneous, thin membranes.

The prior art includes the following publications:

H. Sontheimer and U. Rohmann, "Grundwasserbelastung mit Nitrat—Ursachen, Bedeutung, Lösungswege" [Pollution of Groundwater with Nitrate—Causes, Importance and Remedies], gwf-wasser/abwasser, 125 (1984) 599-608, R. Rautenbach, W. Kopp, G. van Opbergen, T. Peters and R. Hellekes, "Elektrodialyse zur Nitratentfernung aus Grundwässern" [Electrodialysis for Removing Nitrates from Groundwaters], gwfwasser/abwasser, 126 (1985) 349-355, R. Rautenbach, W. Kopp, R. Hellekes, R. Peters and G. van Opbergen, "Separation of Nitrate from Well Water by Membrane Processes (Reverse Osmosis/Electrodialysis Reversal)", Aqua, 5 (1986) 279-282, M. Perr and O. Kedem, "La purification de l'eau par electrodialyse du nitrate" [The Purification of Water for Nitrates by Electrodialysis], Eau Ind., 55 (1981) 47-52, A. Eyal and 0. Kedem, "Nitrate-selective Anion-Exchange Membranes", J. Membrane Sci., 38 (1988) 101-111, D. A. Cowan and J. H. Brown, "Effect of Turbulence on Limiting Current in Electrodialysis Cells", Ind. Eng. Chem., 51 (1959) 1445-1448,

DE-A-3,041,209,

DE-A-2,855,775

U.S. Pat. No. 3,510,417,

U.S. Pat. No. 3,510,418.

U.S. Pat. No. 3,510,417 and U.S. Pat. No. 3,510,418 describe the production of selective anion exchange membranes and cation exchange membranes which can be employed according to the invention.

Since the known processes for treatment of process water leave something to be desired, there is a great demand for the further development and refinement thereof.

SUMMARY OF THE INVENTION

Accordingly, one object of this invention, as defined in patent claims 1 and 6, is to provide a process and an apparatus for removing nitrates from a water stream during treatment of process water, in which process addition of chemicals and considerable maintenance are not necessary and selective nitrate removal as specifically as possible is ensured in a form which means that additional complex equipment is not necessary. The process should if possible be universally applicable to a very wide variety of types and compositions without special specific adaptation.

Investigations have shown that membranes having a selectivity $\alpha > 1$ for chloride transport over sulfate transport also have a selectivity $\alpha > 2$ for nitrate transport over bicarbonate transport if the current applied is less than 50% of the limiting current. Selectivity $\alpha$ is defined here as follows:

$$\alpha^{Cl^-}_{SO_4^{2-}} = \frac{dN_{Cl^-}}{dt \cdot N_{Cl^-}} \cdot \frac{dt \cdot N_{SO_4^{2-}}}{dN_{SO_4^{2-}}}.$$

In this equation, dN/dt is the rate at which a certain ion is removed from aqueous solution at a prespecified constant current density, and N is the concentration of these ions in aqueous solution. The selectivities of various anion exchange membranes at a current density of 1.1 maA/cm$^2$, corresponding to 12% of the limiting current density, based on the one-sided membrane surface, are shown in Table 1 below.

TABLE 1

| Membrane | Type | $a_{SO_4-}^{Cl2-}$ | $a_{HCO_3-}^{NO_3}$ |
|---|---|---|---|
| 1 | AMV | 0.56 | 1.65 |
| 2 | ASV | 3.41 | 2.16 |
| 3 | A-102 | 37.5 | 2.78 |
| 4 | A-201 | 0.50 | 1.62 |
| 6 | MA3475 | 1.40 | 2.22 |
| 7 | AM-1 | 0.52 | 1.69 |
| 8 | ACS | 6.19 | 3.19 |
| 9 | AMX | 0.44 | 1.83 |

Membranes 1 and 2 are supplied by the manufacturer Asahi Glass, membranes 3 and 4 by Asahi Chemical Industries, membrane 6 by IONAC and 7 to 9 from by Tokuyama Soda.

This effect was entirely surprising since it is in no way obvious that a correlation must exist between these two selectivities, particularly since the nitrate/bicarbonate selectivity is a selectivity between 2 monovalent ions.

The selectivity of various cation exchange membranes at a current density of 1.6 mA/cm$^2$, corresponding to 15% of the limiting current density, based on the one-sided membrane surface, are shown in Table 2 below.

TABLE 2

| Membrane | Type | $a_{Ca2+}^{Na+}$ | $a_{Mg2+}^{Na+}$ |
|---|---|---|---|
| 1 | CMV | 0.23 | 0.36 |
| 2 | K-101 | 0.21 | 0.34 |
| 3 | CM-1 | 0.27 | 0.35 |
| 4 | CMX | 0.23 | 0.47 |
| 5 | CMS | 1.94 | 3.26 |
| 6 | K-172 | 1.65 | 3.27 |

Membrane 1 is supplied by the manufacturer Asahi Glass, membranes 2 and 6 by the manufacturer Asahi Chemical Industries and membranes 3-5 by Tokuyama Soda.

In such a membrane choice, current choice and arrangement, the nitrate ions NO$_3^{31}$ are forced to migrate preferentially towards the concentrate, a very high water yield is achieved, and the tendency towards scale formation in the chambers with increasing NO$_3$ concentration and in the components over which the concentrate discharge runs is still further reduced.

The basic idea is in principle to effect selective removal of nitrate ions NO$_3^-$ by carrying out the process in suitable manner and by suitable choice of the materials to be used for the component elements, in particular the membranes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows the diagrammatic structure of a separating apparatus using electrodialysis with the processes principally occurring, FIG. 2 shows a longitudinal section through a diagrammatic electrodialysis apparatus.

DESCRIPTION OF THE PREFERRED EMBODIMENTS

Figure 3:
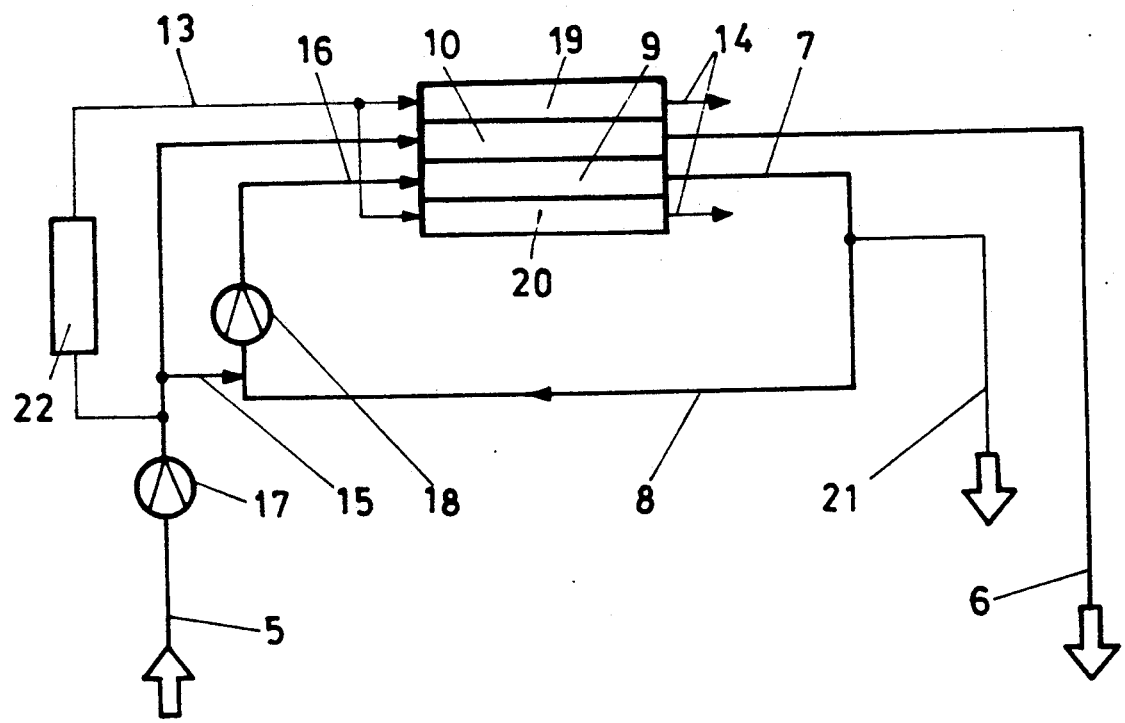
FIG. 3 shows a flow diagram of the basic process of electrodialysis.

Referring now to the drawings, wherein like reference numerals designate identical or corresponding parts throughout the several views, FIG. 1 shows the diagrammatic structure of a separating apparatus using electrodialysis with the processes principally occurring. 1 is the anode, and 2 the cathode in a vessel (which is not represented). 3 are anion exchange membranes having high permeability (migration rate) for nitrate ions NO$_3^-$, which is indicated by a solid arrow pointing towards the anode. By contrast, the relative permeability for other anions (HCO$_3^-$; Cl$^-$; SO$_4^{2-}$) is low, which is expressed by dashed arrows. 4 are cation exchange membranes arranged between the anion exchange membranes, likewise having a relative permeability for sodium ions Na$^+$ and potassium ions K$^+$ which is higher than for the other cations (Ca$^{2+}$; Mg$^{2+}$), which is indicated by a solid arrow pointing towards the cathode. 5 is the untreated water feed, 6 is the diluate discharge (process water), and 7 is the concentrate discharge (part of the water to be removed). 8 indicates the partial recycling of concentrate: part of the concentrate is fed back to the inlet of the electrodialysis apparatus in order to increase the yield. The vessel has a multiplicity of chambers divided by the ion exchange membranes 3 and 4. 9 are chambers having increasing NO$_3^-$ concentration, and 10 are chambers having decreasing NO$_3^-$ concentration. 11 refers to the anions (HCO$_3^-$; NO$_3^-$; SO$_4^{2-}$) passing through the anion exchange membrane 3, 12 refers to the cations (Ca$^{2+}$; Mg$^{2+}$; Na$^+$; K$^+$) passing through the cation membranes 4.

FIG. 2 shows a longitudinal section through a diagrammatic electrodialysis apparatus. Electrodes and membranes are located in a vessel. The reference symbols 1 to 4 correspond exactly to those in FIG. 1. 5 is the untreated water inlet to the chambers 10, 6 is the diluate discharge from the chambers 10 (reduced NO$_3^-$ content), and 7 is the concentrate discharge from the chambers 9 (increased NO$_3^-$ content). 8 is the partial recycling of concentrate. 11 are the anions (symbol −), and 12 are the cations (symbol +). The chambers containing the electrodes (cathode chamber 19; anode chamber 20) have a separate water stream. 13 is the electrode rinsing feed, and 14 is the electrode rinsing discharge.

FIG. 3 shows a flow diagram of the basic process of the electrodialysis. The untreated water feed 5 is provided with an untreated water feed pump 17, which delivers the water into the chamber 10. From the latter, it passes into the diluate discharge 6 as process water. The concentrate is withdrawn from the chamber 9 (concentrate discharge 7) and passed, as a partial concentrate recycling stream 8, together with the untreated water branch stream 15, to the concentrate circulating pump 18 in order to dilute the concentrate return stream. This water is passed to chamber 9 as feed stream 16 of the dilute concentrate from the recycling. Finally, the effluent discharge 21 is branched off from the concentrate stream. The electrode chambers 19 and 20 are separately supplied with water (electrode rinsing feed 13 and discharge 14) via the softening unit 22. The water from the electrode rinsing discharge 14 is fed either to the untreated water feed 5, the partial concentrate recycling stream 8 or the diluate discharge 6 (not represented).

COMPARATIVE EXAMPLE A

In order better to emphasize the effect of the novel process according to the invention, experiments were first carried out in accordance with the prior art. The apparatus had basically the construction as shown in FIG. 2 and was a type P50 apparatus from Société de Recherche Technique et Industrielle (SRTI), France.

The apparatus for carrying out the electrodialysis process comprised a block, constructed on the principle of the filter press, which was limited at a height of 480 mm by two vertical steel end plates 20 mm in thickness and 300 mm in width held together by 4 bolts. In a plan view, the block had a length of 170 mm and a width of 300 mm and, in the flow direction (elevation), a height of 480 mm. An anode 1 and cathode 2 60 mm in width and 380 mm in height made from titanium plates coated with a mixture of $RuO_2$ and $IrO_2$ were arranged immediately adjacent to each of the inner vertical walls of the end plates. A stack of 75 anion exchange membranes 3, not according to the invention, and 75 cation exchange membranes 4, not according to the invention, 100 mm in width, 480 mm in height and 0.3 mm in thickness were employed in the vessel. Each two adjacent membranes were separated by synthetic rubber spacers 0.4 mm in thickness, so that a multiplicity of chambers 9 and 10 having an internal thickness of 0.4 mm, a width of 60 mm and a height in the flow direction of 380 mm were formed. The pipework for the untreated water feed 5, with diluate discharge 6, the concentrate discharge 7, the electrode rinsing feed 13 and the electrode rinsing discharge 14 comprised polyvinyl chloride.

The anion exchange membranes 3 used were membranes with the tradename Neosepta AM-1 from Tokuyama Soda, Tokyo, Japan. Cation exchange membranes 4 used were likewise membranes based on styrene/divinylbenzene with the tradename Neosepta CM-1 from the same company. These anion exchange membranes and cation exchange membranes are produced in similar manner to the membranes of U.S. Pat. No. 3,510,417 or U.S. Pat. No. 3,510,418, the selective surface coating being absent. A pump (like 17 in FIG. 3) was provided to deliver the fluid stream.

The apparatus was charged with 920 l/h (255 cm³/s) of untreated water (feed water) at a temperature of 10° C. In the present case, the diluate and the concentrate passed through the apparatus only once. The yield of denitrified process water (diluate), based on the 920 l/h of untreated water (feed water) fed to the electrodialysis apparatus, was thus 50%. The pressure at the inlet to the electrodialysis cells was about 2 bar, and at the outlet was about 0.5 bar. A potential difference of 52 V was applied to the electrodes 1 and 2. After every 20 minutes, the poles of the electrodes were reversed: 1 became the cathode, 2 became the anode. The functions of the chambers 9 and 10 were thereby also exchanged: 9 became the chamber having decreasing $NO_3^-$ concentration. A corresponding situation applied to the functions of the discharges 6 and 7. The limiting current density was 8 mA/cm². The current density effectively maintained here was 1.8 mA/cm², i.e. 22.5% of the limiting current. Cathode chamber 19 and the anode chamber 20 were each rinsed with 150 l/h of feed water.

The ion concentrations of the untreated water (feed water) and of the diluate (process water) were (mg/l):

TABLE 3

|  | Untreated water (feed water) | Diluate (process water) | Concentrate (effluent) |
| --- | --- | --- | --- |
| $HCO_3^-$ | 393 | 369 | 417 |
| $Cl^-$ | 19 | 14 | 94 |
| $NO_3^-$ | 45 | 41 | 49 |
| $SO_4^{2-}$ | 25 | 14 | 36 |
| $Ca^{2+}$ | 128 | | |
| $Mg^{2+}$ | 17 | | |
| $Na^+$ | 6.8 | | |
| $K^+$ | 4.5 | | |

The selectivity for chloride transport over sulfate transport was accordingly 0.53, while the selectivity for nitrate transport over bicarbonate transport was 1.48.

Comparison of the diluate with the untreated water shows that the level of nitrate ions $NO_3^-$ dropped from 45 mg/l to 41 mg/l, which is entirely inadequate for practical use.

ILLUSTRATIVE EMBODIMENT 1: see FIG. 2!

In the examples below, the same apparatus as in Example A was used.

The anion exchange membranes 3 used were films of a surface-treated synthetic resin having the tradename Neosepta ACS from Tokuyama Soda, Tokyo, Japan, as are known from U.S. Pat. Nos. 3,510,417 and 3,510,418. Cation exchange membranes 4 were the same as in Example A.

The apparatus was charged with 920 l/h (255 cm³/s) of untreated water (feed water) at a temperature of 10° C. The pressure at the inlet to the electrodialysis cells was about 2 bar, and at the outlet was about 0.5 bar. A potential difference of 52 V was applied to the electrodes 1 and 2, so that a mean field strength of 0.49 V/cm prevailed in the chambers 9 and 10. The current density effectively maintained here was 1.8 mA/cm², based on the one-sided surface of the membranes 3 and 4 (22.5% of the limiting current density of 8 mA/cm²).

The cathode chamber 19 and the anode chamber 20 were each rinsed with 150 l/h of feed water.

The ion concentration of the untreated water (feed water) and of the diluate (process water) was (mg/l):

TABLE 4

|  | Untreated water (feed water) | Diluate (process water) | Concentrate (effluent) |
| --- | --- | --- | --- |
| $HCO_3^-$ | 393 | 350 | 436 |

TABLE 4-continued

|  | Untreated water (feed water) | Diluate (process water) | Concentrate (effluent) |
|---|---|---|---|
| $Cl^-$ | 19 | 11 | 27 |
| $NO_3^-$ | 45 | 24 | 66 |
| $SO_4^{2-}$ | 25 | 24 | 26 |
| $Ca^{2+}$ | 128 | 105 | 151 |
| $Mg^{2+}$ | 17 | 16 | 18 |
| $Na^+$ | 6.8 | 6.2 | 7.4 |
| $K^+$ | 4.5 | 1.7 | 7.3 |

The selectivity for chloride transport over sulfate transport was accordingly 13.4, while the selectivity for nitrate transport over bicarbonate transport was 5.42. The selectivity for sodium transport over calcium transport was 0.5.

Comparison of the diluate with the untreated water shows that it was possible to reduce the level of nitrate ions $NO_3^-$ to virtually half thanks to the selectivity of the membranes.

In the present case, the diluate and the concentrate only passed through the apparatus once. The yield of denitrified process water (diluate), based on the 920 l/h of untreated water (feed water) fed to the electrodialysis apparatus, was thus 50%.

ILLUSTRATIVE EMBODIMENT 2: see FIGS. 1 and 3!

The apparatus for carrying out the electrodialysis process corresponded exactly to that of Example 1. However, the procedure was different. In order to increase the water yield (ratio of the process water produced as diluate to the untreated water supplied), part of the concentrate was recycled to the inlet point (partial concentrate recycling stream 8). In the present case, the untreated water supply drawn in by the untreated water feed pump 17 was 1020 l/h (285 cm³/s), of which 100 l/h were passed into the untreated water branch stream 15 in order to dilute the concentrate return stream. The amount of fluid in the concentrate recycling stream 8 was 820 l/h. 100 l/h of the concentrate discharge 7 were discarded as effluent discharge 21. In the chambers 9 and 10, the fluid flow was thus of equal magnitude and was in each case 920 l/h (255 cm³/s). The yield was thus $$\frac{920}{1020} \cdot 100 = 90\%.$$

The temperature of the diluate discharge 6 (process water) was 11.5° C., and that of the concentrate discharge 7 was 12° C. The other operating parameters, such as potential difference, mean field strength and current density, and the membrane types corresponded to those of Example 1.

The ion concentrations in the various fluid streams were (mg/l):

TABLE 5

|  | Untreated water (feed water) | Diluate (process water) | Concentrate (effluent) |
|---|---|---|---|
| $HCO_3^-$ | 393 | 355 | 733 |
| $Cl^-$ | 19 | 12 | 83 |
| $NO_3^-$ | 45 | 25 | 229 |
| $SO_4^{2-}$ | 25 | 24 | 29 |
| $Ca^{2+}$ | 128 | 110 | 294 |
| $Mg^{2+}$ | 17 | 15 | 35 |
| $Na^+$ | 6.8 | 6.4 | 10.8 |
| $K^+$ | 4.5 | 1.8 | 28.3 |

The selectivity for chloride transport over sulfate transport was accordingly 11.3, while the selectivity for nitrate transport over bicarbonate transport was 5.78. The selectivity for sodium transport over calcium transport was 0.4.

The poles of the electrodes were reversed every 20 minutes: 1 became the cathode and 2 became the anode. The function of the chambers 9 and 10 was thereby also exchanged: 9 became the chamber having decreasing $NO_3^-$ concentration, and 10 became the chamber have increasing $NO_3^-$ concentration. A corresponding situation applied to the functions of the discharges 6 and 7.

ILLUSTRATIVE EMBODIMENT 3

The apparatus for carrying out the electrodialysis process corresponded to that of Example 1. However, the procedure was different. Due to the higher $NO_3^-$ concentration in the untreated water feed, a higher potential difference of 58 V was applied to the electrodes 1 and 2. The corresponding current density set effectively was 2.2 mA/cm², corresponding to 22% of the limiting current density, and the mean field strength was 0.55 V/cm. The limiting current density had been determined as being 10 mA/cm².

The ion concentration in the various fluid streams was (mg/l):

TABLE 6

|  | Untreated water (feed water) | Diluate (process water) | Concentrate (effluent) |
|---|---|---|---|
| $HCO_3^-$ | 392 | 343 | 834 |
| $Cl^-$ | 18 | 11 | 76 |
| $NO_3^-$ | 50 | 25 | 293 |
| $SO_4^{2-}$ | 25 | 22 | 57 |
| $Ca^{2+}$ | 130 | 107 | 358 |
| $Mg^{2+}$ | 17 | 14 | 42 |
| $Na^+$ | 6.5 | 6 | 12.4 |
| $K^+$ | 3.8 | 1.8 | 23.6 |

The selectivity for chloride transport over sulfate transport was accordingly 3.85, while the selectivity for nitrate transport over bicarbonate transport was 5.19. The selectivity for sodium transport over calcium transport was 0.41.

ILLUSTRATIVE EMBODIMENT 4

The apparatus for carrying out the electrodialysis process corresponded to that of Example 1. Since the untreated water stream contained an increased concentration of monovalent cations, the cation exchange membranes 4 used here were surface-treated plastic films based on styrene/divinylbenzene with the tradename Neosepta CMS from Tokuyama Soda, Tokyo, Japan. These membranes are produced in accordance with U.S. Pat. Nos. 3,510,417 or 3,510,418. It was thereby possible, taking into account concentrate recycling, to achieve a yield of denitrified process water (diluate) of 95%, based on the amount of untreated water fed to the electrodialysis apparatus. The current density was 20% of the limiting current density.

The ion concentration in the various fluid streams was (mg/l):

TABLE 7

|  | Untreated water (feed water) | Diluate (process water) | Concentrate (effluent) |
|---|---|---|---|
| $HCO_3^-$ | 398 | 360 | 1250 |
| $Cl^-$ | 19 | 12 | 162 |
| $NO_3^-$ | 45 | 25 | 453 |
| $SO_4^{2-}$ | 25 | 24 | 35 |
| $Ca^{2+}$ | 128 | 125 | 190 |
| $Mg^{2+}$ | 0 | 0 | 0 |
| $Na^+$ | 38 | 20 | 406 |
| $K^+$ | 10 | 1.5 | 184 |

The selectivity for chloride transport over sulfate transport was accordingly 11.3, while the selectivity for nitrate transport over bicarbonate transport was 5.86. The selectivity for sodium transport over calcium transport was 27.1.

ILLUSTRATIVE EMBODIMENT 5

The apparatus for carrying out the electrodialysis process corresponded to that of Example 1, with one exception. A softening unit 22, which replaced the Ca and Mg ions present in the water by Na ions, was introduced into the electrode rinsing feed 13. The procedure corresponded to that of Example 1. By feeding softened water for electrode rinsing (feed 13), scale formation did not occur in chambers 19 and 20 and in the corresponding pipework over an experimental period of one month.

The invention is not limited to the illustrative embodiments.

Similar results were achieved using the anion exchange membranes Nos. 2, 3 and 6 as per Table 1, which have a selectivity $\alpha$ for transport of chloride ions over sulfate ions of $>1$, and with the cation exchange membrane No. 6 as per Table 2, which has a selectivity $\alpha$ for the transport of sodium ions over calcium ions of $>1$.

In the process for removing nitrates from a water stream during process water treatment, based on an electrodialysis process which produces, on the one hand, a concentrate 7 which contains high concentrations of nitrate ions and is branched off from the water stream, and, on the other hand, leaves a diluate 6 to be used as process water, the nitrate ions $NO_3^-$ present in the feed water 5 are forced into preferential migration towards the concentrate 7. During this, the value of 50% of a limiting current density is not exceeded for the current density based on the one-sided membrane surface of the ion exchanger.

If the electrical resistance of an electrodialysis apparatus is plotted on the ordinate and the reciprocal of the current on the abscissa of a coordinate system, the resistance curve exhibits, with decreasing current density, possibly after a prior 1st minimum and a subsequent 1st maximum, a 2nd minimum which is lower than the 1st minimum, followed by a virtually linear increase. If the virtually linear increase is extrapolated towards higher currents and the previous decrease in the characteristic of the resistance is extrapolated towards lower currents, a so-called limiting current value is obtained as the intersection of these two extrapolation curves. Dividing this limiting current value by the active, one-sided area of the membranes (perpendicular to the flow direction) gives the limiting current density. In this respect, reference is also made to the document by D. A. Cowan and J. H. Brown mentioned in the introduction. The limiting current density increases with the flow rate of the electrolyte; for normal drinking water it is 70 $A/m^2$–90 $A/m^2$.

The preferential migration of the nitrate ions $NO_3^-$ is achieved with the aid of anion exchange membranes 3 in the form of homogeneous and/or heterogeneous films or foils of aliphatic, aromatic or mixed aliphaticaromatic organic polymers having covalently bound substituents, comprising crown ethers and/or guanidinium and/or quaternary ammonium and/or quaternary phosphonium and/or tertiary sulfonium and/or tertiary oxonium groups, which, at temperatures between 0° C. and 60° C. and in equilibrium with dilute aqueous solutions at pH values between 4 and 9, are principally in positively charged form. The membranes 3 each comprise a condensation polymer or addition polymer or a copolymer or terpolymer or interpolymer or a graft copolymer or a graft terpolymer or mixtures of solutions of such polymers, copolymers or terpolymers. These membrane 3 are essentially insoluble in aqueous, salt-containing solutions. In a dilute, aqueous solution, they have a selectivity $\alpha$ for the transport of chloride ions $Cl^-$ over the transport of sulfate ions $SO_4^{2-}$ of $>1$, the selectivity $\alpha$ being defined as follows:

$$\alpha_{SO_4^{2-}}^{Cl^-} = \frac{dN_{Cl^-}}{dt \cdot N_{Cl^-}} \cdot \frac{dt \cdot N_{SO_4^{2-}}}{dN_{SO_4^{2-}}}$$

where N=concentration of the respective ion type in the aqueous solution, dN/dt=rate at which the particular ion is removed from the aqueous solution at a prespecified constant current density. At least one surface of the anion exchange membrane is advantageously treated during and/or after production thereof in a manner such that its selectivity $\alpha$ for the transport of chloride ions $Cl^-$ over the transport of sulfate ions $SO_4^{2-}$ is $>1$ or preferably $>2$. The anion exchange membrane 3 preferably comprises a derivatized styrene and/or vinylpyridine copolymer.

The process is refined by forcing the monovalent cations present in the feed water 5 preferentially to migrate in the direction of the concentrate with the aid of cation exchange membranes 4 in the form of homogeneous and/or heterogeneous films or foils of aliphatic, aromatic or mixed aliphatic-aromatic organic polymers with covalently bound substituents comprising salts of sulfonic acids and of phosphonic acids and/or perfluorocarboxylic acids, which, at temperatures between 0° C. and 60° C. and in equilibrium with dilute, aqueous solutions at pH values between 5 and 9, are principally in negatively charged form, said membranes 4 each comprising a condensation polymer or addition polymer or a copolymer or terpolymer or interpolymer, or a graft copolymer or a graft terpolymer, or mixtures or solutions of such polymers, copolymers or terpolymers, said membranes 4 being essentially insoluble in aqueous, salt-containing solutions. In dilute, aqueous solution, the membranes 4 have a selectivity $\alpha$ for the transport of sodium ions Na over the transport of calcium ions $Ca^{2+}$ of $>1$, the selectivity $\alpha$ being defined as follows:

$$\alpha_{Ca^{2+}}^{Na^+} = \frac{dN_{Na^+}}{dt \cdot N_{Na^{2+}}} \cdot \frac{dt \cdot N_{Ca^{2+}}}{dN_{Ca^{2+}}}$$

where N=concentration of the particular ion type in aqueous solution, dN/dt=rate at which the particular ion is removed from the aqueous solution at a prespecified constant current density, at least one surface of the cation exchange membrane 4 advantageously being treated during and/or after production thereof in a manner such that its selectivity α for the transport of sodium ions Na+ over the transport of calcium ions $Ca^{2+}$ is >1. The cation exchange membrane 4 preferably comprises a derivatized styrene copolymer.

It is advantageous to keep the current density at a value of less than 50%, preferably 15% to 25%, of the Cowan-Brown limiting current density, and to keep the water flow rate between the membrane surfaces and parallel to the latter on average at a value of from 1 cm/s to 100 cm/s. The electrodialysis process is advantageously carried out by reversing the poles of the electrodes 1 and 2 at intervals of from 10 minutes to 24 hours.

In general industrial practice, part of the concentrate is recycled and admixed with an untreated water substream. The yield of denitrified process water is thereby increased. Furthermore, the untreated water sub-stream rinsing the electrodes 1 and 2 is advantageously previously softened. The volume flow rate in the effluent discharge 21 should preferably be not more than 15% of the volume flow rate in the untreated water feed 5.

The apparatus for removing nitrates from a water stream during the treatment of process water, based on an electrodialysis process has at least one stack for continuous charging with untreated water 5 which contains a multiplicity of chambers 9 and 10, is provided with electrodes 1 and 2 and is sub-divided by plastic membranes 3 and 4. The plastic membranes used are anion exchange membranes 3, in which at least one surface has been treated in a manner such that the membrane 3, in dilute aqueous solution, has a selectivity α for the transport of chloride ions Cl− over the transport of sulfate ions $SO_4^-$ of >1, preferably of >2, with the aim that the nitrate ions $NO_3^-$ are forced into a preferential migration, while the other anions are essentially left in their original concentrations. In the case of the cation exchange membranes 4, at least one surface is treated in a manner such that the membrane 4, in dilute aqueous solution, has a selectivity α for the transport of sodium ions Na+ over the transport of calcium ions $Ca^{2+}$ of >1. The tendency toward scale formation in the chambers 9 with increasing $NO_3$ concentration and in the components over which the concentrate discharge 7 runs is thereby reduced.

In practice, an untreated water feed pump 17 is present in the untreated water feed 5. Furthermore, means for at least partial concentrate recycling 8 and a concentrate circulation pump 18 are provided. Electrodes 1 and 2 preferably comprise $RuO_2$- and/or $IrO_2$-coated titanium or a titanium alloy.

What is claimed as new and desired to be secured by letters patent of the United States is:

1. A process for removing nitrates from a water stream during the treatment of process water by an electrodialysis process which produces a concentrate which contains high concentrations of nitrate ions and is branched off from the water stream, and a diluate to be used as process water, comprising feeding an untreated feed water into an electrodialysis process zone and passing an electric current through said electrodialysis process zone which does not exceed the value of 50% of the limiting current density, thereby effecting the preferential migration of the nitrate ions $NO_3^-$ with the aid of at least one selective anion exchange membrane, which in the water stream, has a selectively α for the transport of chloride ions Cl− over the transport of sulfate ions $SO_4^{2-}$ of >1 currents which do not exceed the value of 50% of the limiting current density.

2. A process as claimed in claim 1, wherein the current density, based on one side of the membrane surface of the anion exchange membrane, does not exceed the value of 25% of the limiting current density.

3. A process as claimed in claim 1, wherein monovalent cations present in the untreated feed water are forced into preferential migration towards the concentrate with the aid of cation exchange membranes, which, in the water stream have a selectively α for the transport of sodium ions Na+ over the transport of calcium ions $Ca^{2+}$ of >1 t currents which do not exceed the value of 50% of the limiting current density of said anion exchange membrane.

4. A process as claimed in claim 1, wherein the volume flow rate in the effluent discharge from the electrodialysis process zone is not more than 15% of the volume flow rate in the untreated feed water.

5. A process as claimed in claim 1, wherein the untreated feed water is previously softened, or at least partially deionized or both softened and at least partially deionized.

6. An apparatus for removing nitrates from a water stream during the treatment of process water by an electrodialysis process comprising:

at least one electrodialysis arrangement which comprises at least one 1st and 2nd electrodialysis chamber, which are bounded by at least one anion exchange membrane and at least one cation exchange membrane, between at least 2 electrodes, and means for controlling the electric current applied to said at least one anion exchange membrane to a value which does not exceed 50% of the limiting current density, wherein the at least one anion exchange membrane has, in the water stream, a selectively α for the transport of chloride ions Cl− over the transport of sulfate ions $SO_4^{2-}$ of >1 at currents which do not exceed the value of 50% of the limiting current.

7. An apparatus as claimed in claim 6, wherein
a) the at least one anion exchange membrane is in the form of films or foils of aliphatic or aromatic or mixed aliphatic-aromatic organic polymers,
b) having substituents of crown ethers, guanidinium, quaternary ammonium, quaternary phosphonium, tertiary sulfonium, tertiary oxonium groups or any combination thereof,
c) which substituents, at temperatures between 0° C. and 60° C. and in equilibrium with aqueous solutions at pH values between 4 and 9, are, to the extent of over 50%, in positively charged form, and
d) the at least one anion exchange membrane comprises a condensation polymer or addition polymer, or a copolymer or terpolymer or interpolymer, or a graft copolymer or a graft terpolymer, or mixtures of solutions of such polymers or copolymers or terpolymers.

8. An apparatus as claimed in claim 6, wherein at least one surface of the at least one cation exchange membrane has, in the water stream, a selectively α for the transport of sodium ions Na+ over the transport of calcium ions $Ca^{2+}$ of $>1$ at currents which do not exceed the value of 50% of the limiting current.

9. An apparatus as claimed in claim 8, wherein
   a) the at least one cation exchange membrane is formed from films or foils of aliphatic or aromatic or mixed aliphatic-aromatic organic polymers,
   b) having substituents of sulfonic acids, phosphonic acids, perfluorocarboxylic acids or any combination thereof,
   c) which substituents, at temperatures between 0° C. and 60° C. and in equilibrium with aqueous solutions at pH values between 4 and 9, are, to the extent of over 50%, in negatively charged form, and
   d) the at least one cation exchange membrane comprises at least one copolymer or terpolymer or interpolymer, or a graft polymer or a graft terpolymer, or mixtures or solutions of such polymers, copolymers or terpolymers.

10. An apparatus as claimed in claim 6, wherein the electrodes comprise $RuO_2$- and/or $IrO_2$-coated titanium or a titanium alloy.

11. A process for removing nitrates from a water stream by electrodialysis comprising:
   feeding an untreated feed water containing various ions into an electrodialysis process zone,
   passing an electric current through said electrodialysis process zone to effect migration of the ions through at least one anionic and at least one cationic exchange membrane, and
   forming a concentrate stream which contains high concentrations of nitrate ions and a diluate stream to be used as process water,
   wherein the electric current does not exceed the value of 50% of the limiting current density and the at least one anionic exchange membrane has a selectively of $\alpha > 1$ for the transport of chloride ions over the transport of sulfate ions.

* * * * *